US006383464B1

(12) United States Patent
Marzari et al.

(10) Patent No.: US 6,383,464 B1
(45) Date of Patent: *May 7, 2002

(54) METHOD FOR REDUCING SULFUR-OXIDE EMISSIONS FROM AN ASPHALT AIR-BLOWING PROCESS

(75) Inventors: Jorge A. Marzari, Argentina; Michael R. Franzen, Lombard, both of IL (US); Jay H. Mirrow, Sylvania, OH (US); David C. Trumbore, La Grange, IL (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 08/724,714

(22) Filed: Sep. 30, 1996

Related U.S. Application Data

(63) Continuation-in-part of application No. 08/599,773, filed on Feb. 12, 1996, now Pat. No. 5,611,910, which is a continuation-in-part of application No. 08/459,081, filed on Jun. 2, 1995, now abandoned.

(51) Int. Cl.[7] .................................................. C01B 7/00
(52) U.S. Cl. ............................ 423/244.01; 423/244.06; 423/244.07; 423/244.08
(58) Field of Search ..................... 208/22, 44, 230; 106/284.03; 95/117; 423/244.01, 244.06, 244.07, 244.08

(56) References Cited

U.S. PATENT DOCUMENTS

| 1,782,186 A | 11/1930 | Abson |
| 1,997,569 A | 4/1935 | Craig et al. |
| 2,112,250 A | 3/1938 | Penniman |
| 2,179,208 A | 11/1939 | Burk et al. |
| 2,200,914 A | 5/1940 | Burk et al. |
| 2,272,866 A | 2/1942 | Burk et al. |
| 2,287,511 A | 6/1942 | Burk et al. |
| 2,313,596 A | 3/1943 | Sorem et al. |
| 2,450,756 A | 10/1948 | Hoiberg |
| 2,488,293 A | 11/1949 | Hoiberg |

(List continued on next page.)

FOREIGN PATENT DOCUMENTS

| DE | WO-93/03823 A1 | * 3/1993 | ............ B01D/53/34 |
| JP | 01-117592 | * 7/1989 | .................. 208/44 |

OTHER PUBLICATIONS

Kirk–Othmer Encyclopedia of Chemical Technology, 4th edition, vol. 1, 1991, pp. 799–800. No Month.
Schaak et al., "Formaldehyde–Methanol, Metallic–Oxide Agents Head Scavengers List," Technology, Oil and Gas Journal, Jan. 23, 1989, pp. 51–55.

(List continued on next page.)

Primary Examiner—Steven P. Griffin
Assistant Examiner—Edward M. Johnson
(74) Attorney, Agent, or Firm—Inger H. Eckert; James J. Dottavio

(57) ABSTRACT

A method for substantially reducing sulfur-oxide emissions from an asphalt air-blowing process involves adding an emission-reducing additive to the asphalt prior to air-blowing, or early in the air-blowing process, and filtering the flue gases produced in the process. The emission-reducing additive includes at least one metal hydroxide, metal oxide, metal carbonate, or metal bicarbonate, where the metal is sodium, potassium, calcium, magnesium, zinc, copper, or aluminum. The filter is preferably of the fiber-bed type, and removes at least a portion of the sulfur-containing compounds via condensation. The filtered stream of flue gases is subjected to an incineration process before being passed into the atmosphere.

19 Claims, 3 Drawing Sheets

U.S. PATENT DOCUMENTS

| | | | |
|---|---|---|---|
| 2,506,283 A | 5/1950 | Smith et al. | |
| 2,627,498 A | 2/1953 | Fink et al. | |
| 2,776,932 A | 1/1957 | Hardman | |
| 2,861,940 A | 11/1958 | Apellaniz | |
| 3,126,329 A | 3/1964 | Fort | |
| 3,440,073 A | 4/1969 | Fowler et al. | |
| 3,839,190 A | 10/1974 | Frese et al. | |
| 3,919,072 A | 11/1975 | Pitchford et al. | |
| 4,144,359 A * | 3/1979 | Zahldi et al. | 427/39 |
| 4,199,431 A | 4/1980 | Carlos | |
| 4,202,755 A | 5/1980 | Spiegelman et al. | |
| 4,338,137 A | 7/1982 | Goodrich | |
| 4,428,828 A | 1/1984 | Bose | |
| 4,440,579 A | 4/1984 | Eidem | |
| 4,456,523 A | 6/1984 | Carlos et al. | |
| 4,456,524 A | 6/1984 | Wombles et al. | |
| 4,544,411 A | 10/1985 | Wombles et al. | |
| 4,618,373 A | 10/1986 | Eidem | |
| 4,741,868 A * | 5/1988 | Rooney et al. | 200/505 C |
| 4,801,332 A | 1/1989 | Selfridge et al. | |
| 4,806,232 A | 2/1989 | Schmidt | |
| 4,908,064 A | 3/1990 | Plummer | |
| 4,915,714 A | 4/1990 | Teague et al. | |
| 5,045,094 A | 9/1991 | Paranjpe | |
| 5,104,518 A | 4/1992 | Jager | |
| 5,330,569 A | 7/1994 | McGinnis et al. | |
| 5,352,275 A * | 10/1994 | Nath et al. | 95/117 |
| 5,456,891 A * | 10/1995 | Fattinger et al. | 423/213 |
| 5,611,910 A * | 3/1997 | Marazri et al. | 208/44 |

OTHER PUBLICATIONS

Schaak et al., "Caustic Based Process Remains Attractive", *Technology, Oil and Gas Journal*, Jan. 30, 1989, pp. 81–82.

Garrett et al., "Chemical Scavengers For Sulfides In Water–Base Drilling Fluids", *Journal of Petroleum Technology*, Jun. 1979, pp. 787–796.

Santucci et al., "The Effect Of Crude Source And Additives On The Long–Term Oven Aging Of Paving Asphalts," Asphalt Paving Technology, 1981, vol. 50, pp. 560–571. No Month.

* cited by examiner

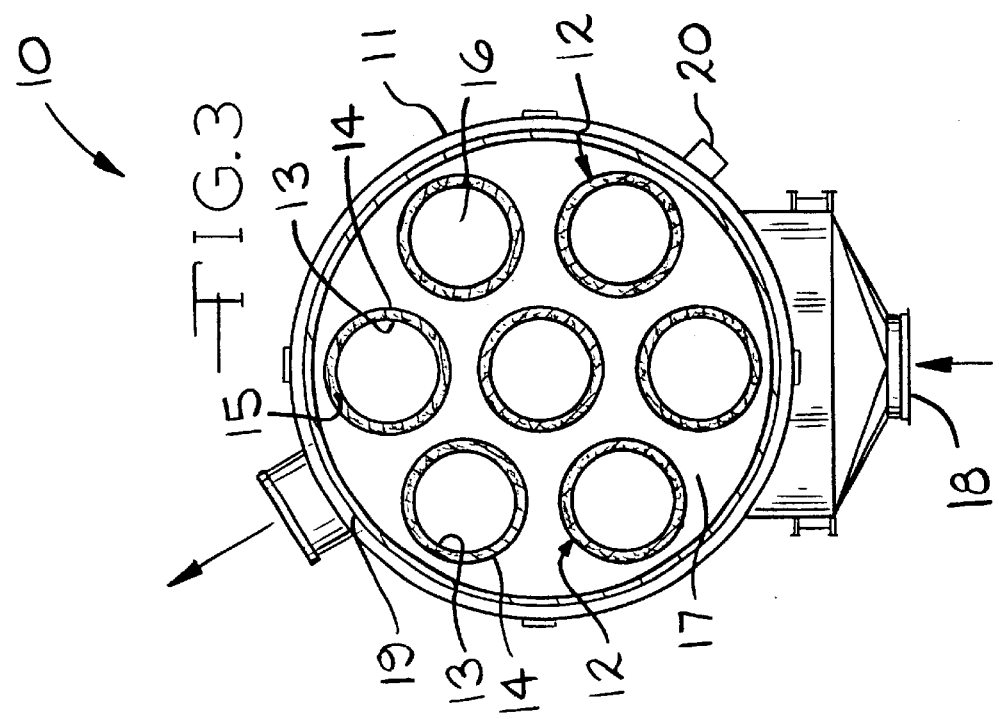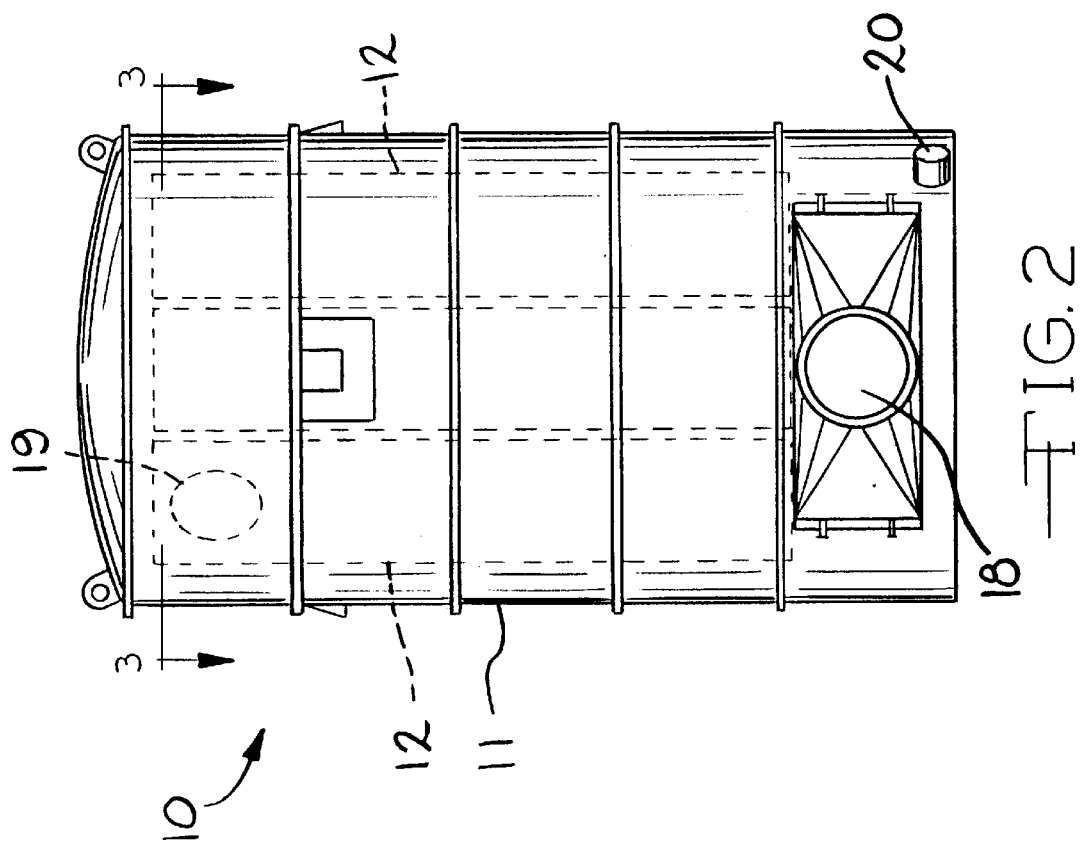

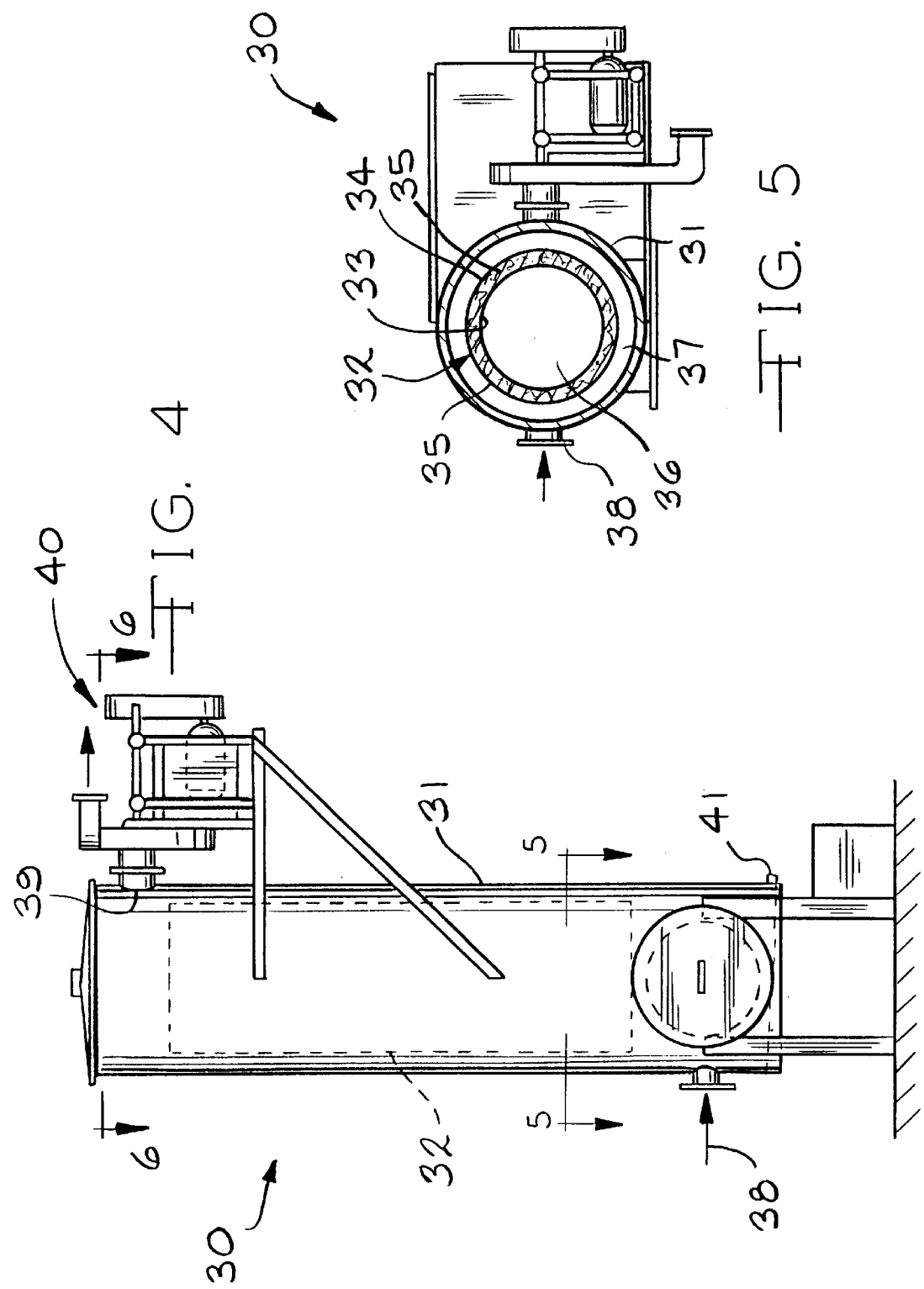

METHOD FOR REDUCING SULFUR-OXIDE EMISSIONS FROM AN ASPHALT AIR-BLOWING PROCESS

CROSS-REFERENCE TO RELATED APPLICATIONS

This application is a continuation-in-part of U.S. patent application Ser. No. 08/599,773, filed Feb. 12, 1996, by Jorge A. Marzari et al, now U.S. Pat. No. 5,611,910 which is a continuation-in-part of U.S. patent application Ser. No. 08/459,081, filed Jun. 2, 1995, by Jorge A. Marzari, now abandoned.

TECHNICAL FIELD AND INDUSTRIAL APPLICABILITY

The invention is directed to an improved method for reducing sulfur-oxide emissions from an asphalt air-blowing process. More particularly, this invention relates to a method for reducing sulfur-oxide emissions using a filter and an emission-reducing additive. The method has industrial applicability, e.g., in air-blowing asphalt for use as a roofing asphalt or specialty coating.

BACKGROUND OF THE INVENTION

Although most asphalts are used in paving, a significant percentage are used for other applications, primarily roofing and specialty coatings. Asphalts for roofing and specialty coatings are typically air-blown to reduce aging and to increase resistance to weathering. The air-blowing process also increases the usefulness of the asphalt by raising the softening point from a typical starting point of about 40° C. to a softening point of about 80° C. or higher.

The air-blowing process involves loading the asphalt raw material into a converter at a temperature of from about 150° C. to about 205° C. Air is bubbled or blown through the molten asphalt. The reaction produced by the blowing is exothermic and raises the temperature of the asphalt to about 260° C. The maximum temperature is usually controlled by a water-cooled jacket. The process is usually carried out in batches. The processing time can take from about 1 hour to about 18 hours to reach the desired softening point. The processing time is dependent on the process temperature, the air flow rate, the characteristics of the asphalt, and the desired product. Catalysts are frequently blended into the mixture to increase the reaction rate and thereby reduce the processing time.

One of the problems with asphalt processing is the generation of undesirable gaseous emissions. The asphalt air-blowing process generates flue gases typically containing hydrogen sulfide, sulfur oxides ($SO_x$), organosulfur compounds, hydrocarbons, nitrogen oxides ($NO_x$), carbon monoxide, and water. Higher throughputs of asphalt in the air-blowing process result in greater amounts of flue gases. Prior to release into the atmosphere, the flue gases are passed through a water-sealed knockout tank and then subjected to an incineration process to control the emissions of volatile organic compounds.

Unfortunately, the incineration process does not control emissions of all the above gases. Sulfur-containing compounds from the asphalt flue gases are oxidized in the incinerator and exit as sulfur-oxide emissions. Typical undesirable sulfur-oxide emissions include sulfur dioxide ($SO_2$) and sulfur trioxide ($SO_3$), and combinations of these compounds with other substances such as water.

Sulfur-oxide compounds are responsible for the generation of acid rain when they condense with humidity. In order to comply with environmental emissions regulations, asphalt-processing plants make use of sound and proven best-available emissions-reduction technology. If the regulated emission levels are not achieved, the asphalt production could be restricted below capacity, or the plant could be forced to pay high fines or penalties.

One process currently used to reduce sulfur-oxide emissions involves cleaning incinerated gases with expensive caustic scrubber equipment. The scrubbers require extensive initial capital costs and significant annual operating costs. The caustic scrubbing process also generates an additional waste stream containing undesirable byproducts, such as sodium and potassium sulfides, sulfites, and sulfates, all of which require special handling for disposal. Other processes are also known for reducing sulfur-oxide emissions, but the processes all suffer from various drawbacks.

Some methods for separating some types of sulfur compounds from certain industrial processes using filters or condensers are known. For example, U.S. Pat. No. 4,915, 714 to Teague et al. and U.S. Pat. No. 5,045,094 to Paranjpe disclose fiber filters for use in removing sulfuric-acid mist in an acid-manufacturing process. U.S. Pat. No. 4,741,868 to Rooney et al. discloses fiber filters for use in removing $SO_3$ vapors from a storage tank. U.S. Pat. No. 2,112,250 to Penniman discloses condensers to remove sulfur oxides from a vapor stream formed by oxidizing petroleum. However, there remains a need for an effective method of reducing sulfur-oxide emissions from an asphalt air-blowing process.

SUMMARY OF THE INVENTION

One object of the invention is to provide a method for reducing sulfur-oxide emissions from an asphalt air-blowing process without requiring high-cost equipment. Another object is to provide a method that can greatly reduce sulfur-oxide emissions, where the throughput in the air-blowing process is advantageously high while still complying with environmental emissions regulations. A further object is to provide a method for reducing sulfur-oxide emissions prior to the end of the air-blowing process, so that no additional solid or liquid waste stream is created.

These and other objects and advantages have now been achieved through the inventive method for reducing sulfur-oxide emissions from an asphalt air-blowing process. In this method, an emission-reducing additive is combined with asphalt prior to air-blowing, or early in the air-blowing process. The asphalt is subjected to an air-blowing process which produces flue gases including sulfur-containing compounds, and the flue gases are passed through a filter to remove at least a portion of the sulfur-containing compounds. After passing through the filter, the flue gases are subjected to an incineration process before being emitted into the atmosphere. The combination of the filter and emission-reducing additive preferably reduces sulfur-oxide emissions from the asphalt air-blowing process by at least about 50% by weight over the same process without the filter and emission-reducing additive.

The emission-reducing additive is preferably at least one compound selected from metal hydroxides, metal oxides, metal carbonates, metal bicarbonates, and mixtures thereof. Preferred metals are sodium, potassium, calcium, magnesium, zinc, copper, aluminum, and mixtures thereof. An especially preferred additive contains an alkali-metal hydroxide and zinc and copper oxides.

The filter or phase-change element is preferably a fibrous or fabric material, such as a packing of glass or polymer fibers. A preferred fibrous filter material has a packed fiber density of from about 130 kilograms/meter$^3$ to about 320 kilograms/meter$^3$. Preferably, the ratio of the gas flow rate in cubic meters per minute to filter surface area in square meters is from about 0.9 to about 9, more preferably from 1.5 to 4.6.

One embodiment of the inventive method for reducing sulfur-oxide emissions from an asphalt blowing process comprises: adding to an asphalt an emission-reducing additive comprising a metal hydroxide, metal oxide, metal carbonate, and/or metal bicarbonate, wherein the metal is selected from sodium, potassium, calcium, magnesium, zinc, copper, and aluminum, to form an asphalt-additive mixture; subjecting the asphalt-additive mixture to a blowing process that produces a gas stream including sulfur-containing compounds; passing the gas stream through a fiber filter to remove at least a portion of the sulfur-containing compounds, wherein the filter comprises fibers packed at a density of from about 130 kilograms/meter$^3$ to about 320 kilograms/meter$^3$, the ratio of the flow rate of the gas stream through the filter to the surface area of the filter is from about 0.9 meter$^3$/minute-meter$^2$ to about 9 meters$^3$/minute-meter$^2$, and the gas stream is at a temperature not greater than about 121° C. when passed through the filter; and subjecting the filtered gas stream to an incineration process. Another embodiment includes the steps of: adding to an asphalt an emission-reducing additive in an amount of from about 0.1% to about 2.0% by weight of the asphalt combined with the emission-reducing additive, the emission-reducing additive comprising at least one metal hydroxide selected from sodium hydroxide, potassium hydroxide, calcium hydroxide, and magnesium hydroxide, and at least one metal oxide selected from zinc oxide, copper oxide, and aluminum oxide; subjecting the asphalt to an air-blowing process that produces a gas stream including sulfur-containing compounds; passing the gas stream through a filter to condense and remove at least a portion of the sulfur-containing compounds; and subjecting the filtered gas stream to an incineration process.

Other embodiments and features of the invention will become apparent from the detailed description in conjunction with the drawing figures.

BRIEF DESCRIPTION OF THE DRAWINGS

FIG. 2 is a side-elevational view of a commercial-scale filter for use in the invention.

FIG. 3 is a cross-sectional view of the filter taken along line 3—3 of FIG. 2.

FIG. 4 is a side-elevational view of a smaller-scale filter for use in the invention.

FIG. 5 is a cross-sectional view of the filter taken along line 5—5 of FIG. 4.

DETAILED DESCRIPTION AND PREFERRED EMBODIMENTS OF THE INVENTION

Figure 1:
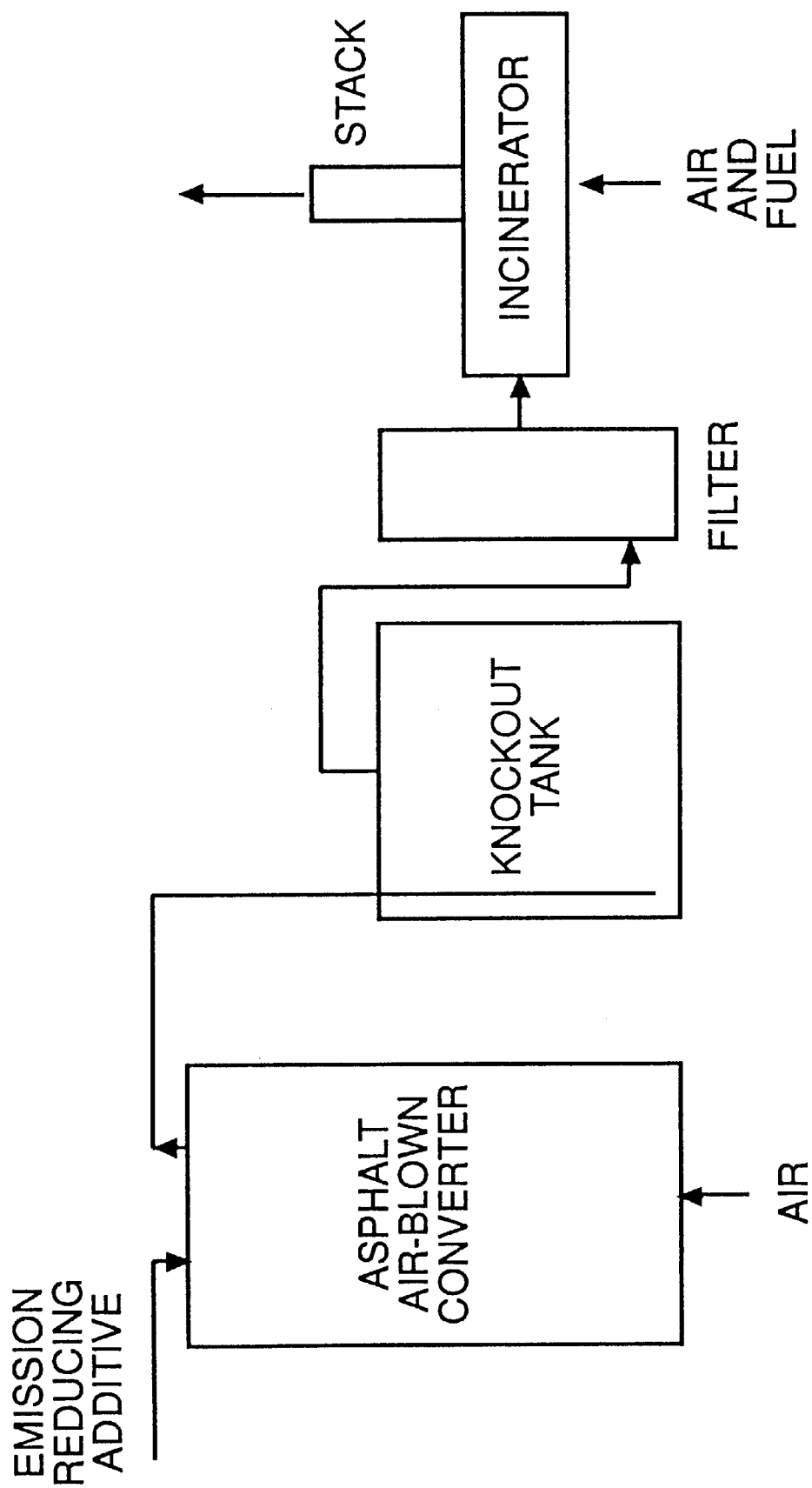
FIG. 1 is a flow diagram of an asphalt air-blowing process including a filter for reducing sulfur-oxide emissions in accordance with this invention.

FIG. 1 schematically depicts a preferred embodiment of an asphalt air-blowing process equipment setup that incorporates a filter for reducing sulfur-oxide emissions in accordance with this invention. The equipment includes an asphalt air-blown converter, which can be any standard or suitable converter for asphalt-processing. Preferably, the converter is adapted for air flows of from about 2 meters$^3$/minute to about 85 meters$^3$/minute, where the volume of the gas is given at STP (standard temperature and pressure, i.e., 25° C. and 1 atmosphere).

An asphalt raw material is loaded into the converter at a temperature of from about 150° C. to about 205° C. The asphalt material can be either a naturally occurring asphalt or a manufactured asphalt produced by refining petroleum. It can include straight-run fractional-derived asphalts, cracked asphalts, and asphalts derived from processing techniques such as asphalt oxidizing, propane deasphalting, steam distilling, chemically modifying, and the like. The asphalt material can be either modified or unmodified. Preferably, the asphalt material is a roofing flux. Other types of asphalt materials that may be used include specialty asphalts, such as water-proofing asphalts, battery compounds, and sealers. Blends of different kinds of asphalt can also be air-blown.

An emission-reducing additive is added to the asphalt to reduce sulfur-oxide emissions from the air-blowing process. While not intending to be limited by theory, it is believed that the additive reduces sulfur-oxide emissions by retaining a portion of the sulfur-containing compounds in the asphalt. Consequently, the sulfur-containing compounds remain as part of the asphalt product instead of being emitted as a waste stream in the flue gases. The emission-reducing additive can be added in any suitable manner, preferably by blending it into the asphalt prior to the air-blowing process or by adding it into the converter early in the process, preferably within about the first two hours. The emission-reducing additive is effective throughout the duration of the process. However, peak sulfur-oxide emissions are found generally during the first 1.5 hours of an air-blowing process without any additive. Therefore, if the emission-reducing additive is added late in the process, it will reduce emissions only from the time it is blended into the asphalt.

The emission-reducing additive preferably comprises at least one compound selected from metal hydroxides, metal oxides, metal carbonates and metal bicarbonates, where the metal is selected from sodium, potassium, calcium, magnesium, zinc, copper and aluminum. Mixtures or combinations of the compounds can also be used.

More preferably, the additive comprises at least two of these compounds, including at least one compound where the metal is selected from sodium, potassium, calcium and magnesium, and at least one compound where the metal is selected from zinc, copper and aluminum. Even more preferably, the additive includes at least one metal hydroxide selected from sodium, potassium, calcium and magnesium hydroxides, and at least one metal oxide selected from zinc, copper and aluminum oxides. In another especially preferred embodiment, the additive includes two compounds selected from zinc oxide, copper oxide and aluminum oxide. The copper oxide may include cuprous oxide ($Cu_2O$) and/or cupric oxide (CuO).

Most preferably, the additive includes one alkali-metal hydroxide selected from sodium hydroxide and potassium hydroxide, and one or two metal oxides selected from zinc oxide, copper oxide and aluminum oxide. The alkali-metal hydroxide is widely available and is typically less expensive than the metal oxide. As discussed below, the air-blown asphalt product has certain improved properties when such an emission-reducing additive is employed.

In a particularly preferred embodiment, the emission-reducing additive comprises from about 0.05% to about 0.75% alkali-metal hydroxide (NaOH or KOH), from about 0.02% to about 0.7% zinc oxide, and from about 0.01% to about 0.5% copper oxide, wherein the percentages are by weight of the combined asphalt and additive. More preferably, the emission-reducing additive comprises from about 0.1% to about 0.4% alkali-metal hydroxide, from about 0.05% to about 0.4% zinc oxide, and from about 0.02% to about 0.15% copper oxide. Most preferably, the emission-reducing additive comprises from about 0.1% to about 0.3% alkali hydroxide, from about 0.1% to about 0.3% zinc oxide, and from about 0.025% to about 0.1% copper oxide. Such additives have a synergistic effect in the reduction of sulfur-oxide emissions compared to the addition of a single compound. Consequently, the emission-reducing additive can contain lower levels of alkali-metal hydroxide than would otherwise be required for the same reduction in emissions. These lower levels of alkali-metal hydroxide yield asphalt materials that have little or no detrimental effect on roofing materials such as can be caused by using asphalts containing higher levels of alkali-metal hydroxide.

The preferred form of the sodium hydroxide or potassium hydroxide is a concentrated water solution, preferably having at least 45 percent alkali-metal hydroxide by weight of the solution. The alkali-metal hydroxide can also be added as solid pellets. The mixing of the alkali-metal hydroxide with the asphalt is preferably carried out in the converter, and at a temperature of from about 90° C. to about 260° C. An alternative mixing process is to mix the asphalt with the alkali hydroxide in a tank separate from the converter.

The zinc, copper and/or aluminum oxide is preferably added to the asphalt in particulate form, more particularly in the form of a powder. The mixing of the metal oxide(s) with the asphalt is preferably carried out at a temperature of from about 90° C. to about 260° C. The metal oxide can be added to the asphalt in the converter, or it can be mixed with the asphalt in a tank separate from the converter. The metal oxide and the alkali-metal hydroxide materials can also be added to a recirculating asphalt reflux. An alternative is to premix the metal oxide(s) together with the alkali-metal hydroxide(s) and add the premix to the converter.

The emission-reducing additive is preferably present in an amount which does not substantially change the rate or throughput of the asphalt air-blowing process when compared with the same process without the emission-reducing additive. Also, the emission-reducing additive contains an amount of alkali-metal hydroxide sufficient to provide the air-blown asphalt with the desired softening point, viscosity, and penetration properties. The penetration of the asphalt is preferably increased to a level above that which would be achieved without the emission-reducing additive. As a result, the starting asphalt can be selected from a wide variety of sources worldwide.

The final asphalt product preferably has a penetration of from about 12 mm/10 to about 35 mm/10 at 25° C. and a softening point of from about 80° C. to about 120° C. The pliability and ductility of the asphalt product may also be improved.

Referring again to FIG. 1, the asphalt air-blowing process involves passing air or another oxygen-containing gas through the asphalt in the converter. Other suitable oxygen-containing gases include steam, oxygen and ozone. A mixture of an oxygen-containing gas with an inert gas such as nitrogen or helium can also be used.

The temperature of the asphalt during air-blowing is preferably from about 150° C. to about 290° C. The air-blowing process is preferably conducted for a time of from about 1 hour to about 18 hours. If desired, a conventional catalyst such as ferric chloride can be added to the asphalt to reduce the processing time.

The air flow (STP) in the converter is typically from about 14 to 360 liters per hour/liter of processed asphalt. The air passes through the asphalt and produces a gas stream—i.e., flue gases. The passing air strips amounts of some materials from the asphalt, such as hydrogen sulfide, sulfur oxides, organosulfur compounds, hydrocarbons, nitrogen oxides, carbon monoxide, water, ammonia and other materials.

As shown in FIG. 1, the flue gases exit the converter and pass through ductwork to a knockout tank. The knockout tank is partially filled with blowing distilled oil (i.e., condensed material in the knockout tank). The flue gases are bubbled through the blowing distilled oil. In the knockout tank, large amounts of material from the flue gases are condensed, but a significant amount of gaseous material passes through uncondensed.

A filter is positioned between the knockout tank and the incinerator. The filter removes sulfur-containing compounds such as sulfur oxides by filtration of the cooled flue gases. The gases can be cooled either by natural heat exchange from the ductwork to the atmosphere, or by any other suitable gas-cooling operation or apparatus.

The filter can be any type of filter capable of removing condensable sulfur-containing compounds from the gas stream. Preferably, the filter is a fiber-bed filter. Such filters are described in, e.g., Kirk-Othmer, *Encyclopedia of Chemical Technology*, 4th Ed., vol. 1, pages 799–800 (1991). The fiber bed includes a fiber-bed element for removing the sulfur-containing compounds from the flue gases. The fiber-bed element is made from fibers that are packed either randomly or in alignment. The use of randomly oriented fiber beds is preferred. The randomly oriented fiber beds include those made with mineral fibers, such as glass fibers, polymer fibers such as polyester fibers or polypropylene fibers, and fluorocarbon fibers. An example of a type of suitable fibers is glass fibers having an average diameter of from about 1 to about 2 microns. Other fibers compatible with the emission-reducing additive and with asphalt may be used. Polymer fibers and glass fibers are preferred for use in the invention, with polymer fibers such as polyester fibers being especially preferred because of their high degree of compatibility with the emission-reducing additive.

As the flue gases pass through the fiber-bed element, sulfur-containing compounds and other condensable materials are captured as small droplets of liquids by the fibers. The captured droplets coalesce on the fibers and form larger drops. The drops of liquid drain downwardly under the influence of gravity and can be collected.

FIGS. 2 and 3 illustrate a preferred industrial-scale fiber-bed filter 10 for use in the invention. Such filters are available from Fabric Filters Air Systems, P.O. Box 6866, Portland, Oreg. 97208. The filter 10 includes a cylindrical housing 11. Seven cylindrical fiber-bed elements 12 are mounted within the housing. Each of the elements 12 includes a pair of concentric screens 13, 14 with glass-fiber material 15 packed randomly between the screens. The area inside each of the elements 12 defines an interior space 16, and the area between the elements 12 defines an exterior space 17.

In operation, the flue gases enter through a filter inlet 18 located near the bottom of the filter 10. The flue gases flow into the interior space 16 inside each of the fiber-bed elements 12. As the flue gases flow upward through the filter 10, they are forced outwardly through each of the elements 12 into the exterior space 17. The flue gases are then forced out of the filter 10 through an outlet 19. If desired or necessary, flow-assist means such as a fan (not shown) can be positioned at the outlet 19 to help force the flue gases through the filter. The sulfur-containing compounds are captured with the other condensable materials by the glass fibers 15 as small droplets of liquids, and coalesce to form larger drops which drain downwardly under the influence of gravity. The collected liquids exit through drain 20.

In another embodiment (not shown), each of the fiber-bed elements can include an inner filter element and an outer filter element. The flue gases flow upward between the inner and outer filter elements, and are forced through each of the elements.

FIGS. 4 and 5 illustrate a preferred smaller-scale fiber-bed filter 30 for use in another embodiment of the invention. Such filters are also available from Fabric Filters Air Systems. The filter 30 includes a cylindrical housing 31. A single, cylindrical fiber-bed element 32 is mounted within the housing. The element 32 is comprised of a pair of concentric screens 33, 34 with glass fibers 35 packed randomly between the screens. The area inside the fiber-bed element 32 defines an interior space 36, and the area outside the element 32 defines an exterior space 37.

In operation of the embodiment shown in FIGS. 4 and 5, the flue gases enter through a filter inlet 38 located near the bottom of the filter 30. The flue gases flow into the interior space 36 inside the fiber-bed element 32. As the flue gases flow upward through the filter 30, they are forced outwardly through the element 32 into the exterior space 37. The flue gases are then forced out of the filter through an outlet 39. A fan 40 is positioned to help pull the flue gases through the filter. The sulfur-containing compounds are captured by the glass fibers 35 with the other condensable materials as small droplets of liquids, and coalesce to form larger drops which drain downwardly and are collected through drain 41. Preferably, the fibers are packed in such a way that the fiber-bed element has a density of from about 130 kilograms/meter$^3$ to about 320 kilograms/meter$^3$, and more preferably from about 190 kilograms/meter$^3$ to about 260 kilograms/meter$^3$. A high filter-packing density increases the surface area of the fibers for removing the sulfur-containing compounds. If the density is too high, however, the fiber-bed element will undesirably restrict the flow of the flue gases and cause an excessive pressure drop. A fiber-bed element with fibers packed to a density of from 130 kilograms/meter$^3$ to 320 kilograms/meter$^3$ is very efficient in removing sulfur-containing compounds from the flue gases without causing an excessive pressure drop.

The ratio of the flow rate of the flue gases through the filter to the surface area of the filter is also important for efficient removal of the sulfur-containing compounds. If this ratio of flow rate to surface area is too large, the filter becomes saturated with droplets too quickly and has reduced efficiency. On the other hand, if the ratio is too low, the filter may be oversized. Preferably, the filter has a flow rate to surface area ratio of from about 0.9 meter$^3$/minute-meter$^2$ to about 9 meters$^3$/minute-meter$^2$, and more preferably from about 1.5 meters$^3$/minute-meter$^2$ to about 4.6 meters$^3$/minute-meter$^2$. The flow rate of the flue gases is given in meters$^3$/minute with the gas volume being given at STP. The surface area of the filter is the surface area in square meters of the surface of the filter facing the oncoming flue gases. For example, the surface area of the filter 30 of FIGS. 4 and 5 is the surface area of the cylindrical inner surface of element 32. Similarly, the surface area of the filter 10 of FIGS. 2 and 3 is the sum of the surface areas of the cylindrical inner surfaces of all seven of the elements 12.

The flue gases exit the converter at a typical temperature of about 260° C. The flue gases cool as they flow through the knockout tank and the ductwork to the filter. Preferably, the flue gases are at a temperature not greater than about 121° C. when they flow through the filter, and more preferably from about 49° C. to about 93° C. The combination of the cooler temperature and the high surface area of the filter causes a significant portion of the remaining sulfur-containing compounds in the flue gases to condense as liquid droplets on the filter. If desired or necessary, a precooling means such as a heat exchanger can be used to cool the gas stream prior to the filter.

Referring again to FIG. 1, the flue gases exit the filter and pass through ductwork to an incinerator. The incineration process reduces the concentration of volatile organic compounds in the flue gases. The combusted gas fumes are then emitted to the atmosphere through a stack on the incinerator.

The combination of the filter and the emission-reducing additive advantageously reduces the sulfur-oxide emissions from the air-blowing process by at least about 50% by weight over the same process without the filter and additive. Preferably, the SO$_x$ emissions are reduced at least about 65%, more preferably at least about 75%, and most preferably at least about 85%. Thus, the method of this invention is capable of greatly reducing sulfur-oxide emissions. Consequently, throughput of asphalt in the air-blowing process can be maximized while still complying with environmental regulations governing emissions. Moreover, the reduction in emissions is accomplished without generating any new waste stream, whereas known caustic scrubbing technologies for sulfur-oxide reduction typically create a new waste stream.

The sulfur-oxide emissions are measured by drawing a stream of effluent from the incinerator stack through a heated sample line at 127° C., then through a gas conditioner at 2° C. to remove moisture, and then through a photometric analyzer (Bovar Model 721 Photometric Analyzer, Bovar Equipment Co., P.O. Box 1440, Voltastrasse #7, 6234 Hattershein, Germany) at a flow rate of 1 liter/minute. The sulfur-oxide emissions are measured in parts per million. The percent reduction in sulfur-oxide emissions is calculated by comparing the measured sulfur-oxide emissions of the inventive process with those measured from the same asphalt air-blowing process without the filter and emission-reducing additive.

EXAMPLES

An asphalt was made from a blend of 50% by weight of Amoco roofing-flux asphalt (available from Amoco Oil Co., Whiting, Ind.) and 50% by weight of Clark roofing-flux asphalt (available from Clark Oil Co., Blue Island, Ill.). The asphalt had an initial softening point of about 38° C.

Batches of the asphalt were air-blown to a target softening point of about 105° C. Some of the batches were air-blown in a conventional process without using a filter or emission-reducing additive. Other batches were air-blown in a process including a filter between the knockout tank and the incinerator. Other batches were air-blown without the filter, but with the addition of an emission-reducing additive. Finally, other batches were air-blown according to the method of the present invention, with both the filter and the addition of an emission-reducing additive.

The filter used in the examples was the smaller-scale filter 30 illustrated in FIGS. 4 and 5. The fibers in the fiber-bed element 32 were glass fibers randomly packed at a density of about 225 kilograms/meter$^3$. The filter had a flow rate (STP) to surface area ratio of about 1.55 meters$^3$/minute-meter$^2$. The temperature of the flue gases at the filter was about 71° C.

In some batches, the emission reducing-additive contained 0.1% sodium hydroxide, 0.1% zinc oxide, and 0.05% copper oxide, by weight of the combined mixture of asphalt and additive. To add the sodium hydroxide, 454 kilograms of the asphalt were placed in the converter at 205° C., and air was blown at 2300 liters (STP) per minute. Then, 5.5 kilograms of a 50 percent by weight solution of sodium hydroxide were added. Separately, 2.7 kilograms of zinc oxide powder and 1.36 kilograms of copper oxide powder were added to 2270 kilograms of asphalt in a mix tank. The asphalt-hydroxide combination in the mix tank was then pumped to the converter and mixed with the asphalt-oxides combination therein to make a 2724-kilogram batch.

In other batches, the emission-reducing additive contained 0.2% sodium hydroxide, 0.05% zinc oxide, and 0.165% copper oxide, by weight of the combined mixture of asphalt and additive. The emission-reducing additive was added in the same manner as described above to make a 2724-kilogram batch. The amounts of the sodium hydroxide, zinc oxide, and copper oxide added to the asphalt were adjusted to yield the indicated percentages.

The batches of asphalt were air-blown in a converter with an initial air flow of about 2300 liters (STP) per minute for the first 10 minutes. When stabilized, the air flow was increased to about 4600 liters (STP) per minute for the remainder of the process. The batches were air-blown starting at a temperature of about 205° C. and increasing gradually to a temperature of about 260° C. in about 1 ½ hour. The total time of the air-blowing process was about 6 hours.

The sulfur-oxide emissions from the incinerator were measured as described above. The results are shown below in the following table:

TABLE

| NaOH wt. % | CuO wt. % | ZnO wt. % | Filter | $SO_x$ Emissions lb./ton (kg/1000 kg) | $SO_x$ Reduction wt. % | Filter $SO_x$ Reduction wt. % |
|---|---|---|---|---|---|---|
| — | — | — | No | 0.300 (150) | | |
| — | — | — | Yes | 0.188 (94) | 37% | |
| — | — | — | No | 0.276 (138) | | |
| 0.10 | 0.05 | 0.10 | No | 0.080 (40) | 71% | |
| 0.10 | 0.05 | 0.10 | Yes | 0.047 (23.5) | 83% | 41% |
| — | — | — | No | 0.220 (110) | | |
| 0.20 | 0.05 | 0.165 | No | 0.067 (33.5) | 70% | |
| 0.20 | 0.05 | 0.165 | Yes | 0.049 (24.5) | 78% | 27% |
| — | — | — | No | 0.276 (138) | | |
| 0.20 | 0.05 | 0.165 | No | 0.093 (46.5) | 66% | |
| 0.20 | 0.05 | 0.165 | Yes | 0.043 (21.5) | 84% | 54% |

The results for the inventive and comparative batches are given above in four groups (separated by solid horizontal lines). For the first group of batches, the asphalt was air-blown by a conventional process without using either a filter or an emission-reducing additive, and also by a process which included the use of a filter. It can be seen that the filter reduced sulfur-oxide emissions by 37%.

In the second group of batches, the asphalt was air-blown by a conventional process, by a process including addition of an emission-reducing additive but no filter, and by the inventive process including both the filter and an emission-reducing additive. It can be seen that the emission-reducing additive alone reduced sulfur-oxide emissions by 71%. The process according to the present invention, using both the filter and the emission-reducing additive, reduced sulfur oxide emissions by 83%. The addition of the filter reduced sulfur-oxide emissions by an additional 41% compared to the level of emissions with the emission-reducing additive alone.

By comparing the results of the first group of batches with the second group of batches, it can be seen that the filter maintained an efficiency in reducing sulfur-oxide emissions with or without the addition of the emission reducing-additive. This was not predictable because the addition of the emission-reducing additive could have substantially reduced the performance of the filter. It has been found that the methods employing both the filter and the emission-reducing additive provide optimal reduction of sulfur-oxide emissions. Accordingly, the present invention advantageously reduces the sulfur-oxide emissions from the air-blowing process to a great extent.

The results are similar for the third and fourth groups of batches. The combination of the filter and emission-reducing additive resulted in the greatest total reduction in sulfur-oxide emissions, i.e., a reduction of 78% and 84%, respectively.

It should be understood that, although described herein as a method for reducing sulfur-oxide emissions from an asphalt air-blowing process, the invention may also be practiced with other blowing processes that produce sulfur-oxide emissions. Also, the invention may be practiced with other sulfur-containing organic materials in addition to asphalt. And the invention may also reduce the emissions of materials other than sulfur oxides.

Furthermore, the invention may be practiced other than as specifically explained and illustrated without departing from its spirit. Thus, the invention is intended to be defined not by the foregoing description, but by the appended claims and their equivalents.

What is claimed is:

1. A method for reducing sulfur-oxide emissions from an asphalt blowing process comprising:

combining asphalt and an emission-reducing additive comprising at least one additive compound selected from the group consisting of metal hydroxides, metal oxides, metal carbonates, and metal bicarbonates, wherein the metal is selected from the group consisting of sodium, potassium, calcium, magnesium, zinc, copper, and aluminum;

subjecting the asphalt to a blowing process that produces a gas stream containing sulfur-containing compounds;

passing the gas stream through a filter that condenses and removes at least a portion of the sulfur-containing compounds;

and subjecting the filtered gas stream to an incineration process;

wherein the combination of the filter and the emission-reducing additive reduces sulfur-oxide emissions from the asphalt blowing process by at least about 50% by weight over the same process without the filter and emission-reducing additive.

2. A method as defined in claim 1, wherein said filter is a fiber filter.

3. A method as defined in claim 2, wherein said fiber filter comprises a fibrous filter material including polymer fibers or glass fibers.

4. A method as defined in claim 2, wherein said fiber filter comprises a fibrous filter material having a packed fiber density of from about 130 kilograms/meter$^3$ to about 320 kilograms/meter$^3$.

5. A method as defined in claim 4, wherein said packed fiber density is from about 190 kilograms/meter$^3$ to about 260 kilograms/meter$^3$.

6. A method as defined in claim 1, wherein said passing comprises forcing the gas stream through the filter at a ratio of gas flow rate to filter surface area of from about 0.9 (meters$^3$/minute)/meters$^2$ to about 9 (meters$^3$/minute)/meters$^2$.

7. A method as defined in claim 6, wherein said ratio is from about 1.5 (meters$^3$/minute)/meters$^2$ to about 4.6 (meters$^3$/minute)/meters$^2$.

8. A method as defined in claim 1, wherein the gas stream is at a temperature of not greater than about 121° C. during said passing through the filter.

9. A method as defined in claim 8, wherein said temperature of the gas stream is from about 49° C. to about 93° C.

10. A method as defined in claim 1, wherein said filter is a fiber filter including fibers packed at a density of from about 130 kilograms/meter$^3$ to about 320 kilograms/meter$^3$, and the ratio of the flow rate of the gas stream to the surface area of the filter is from about 1.5 (meters$^3$/minute)/meters$^2$ to about 4.6 (meters$^3$/minute)/meters$^2$.

11. A method as defined in claim 10, wherein the sulfur-oxide emissions are reduced by at least about 75% by weight over the same process without the filter and the emission-reducing additive.

12. A method as defined in claim 10, wherein said emission-reducing additive is added in an amount of from about 0.1% to about 2.0% by weight of the combined asphalt and emission-reducing additive.

13. A method as defined in claim 10, wherein said emission-reducing additive comprises one or more said additive compounds where the metal is selected from the group consisting of sodium, potassium, calcium, and magnesium, and one or more other said additive compounds where the metal is selected from the group consisting of zinc, copper, and aluminum.

14. A method as defined in claim 13, wherein the one or more said additive compounds includes a metal hydroxide selected from the group consisting of sodium hydroxide, potassium hydroxide, calcium hydroxide, and magnesium hydroxide, and the one or more other said additive compounds includes at least one metal oxide selected from the group consisting of zinc oxide, copper oxide, and aluminum oxide.

15. A method as defined in claim 14, wherein said metal hydroxide is an alkali-metal hydroxide selected from the group consisting of sodium hydroxide and potassium hydroxide, and said at least one metal oxide includes two different metal oxides selected from the group consisting of zinc oxide, copper oxide and aluminum oxide.

16. A method as defined in claim 15, wherein said emission-reducing additive comprises, by weight of the combined asphalt and the emission-reducing additive, from about 0.05% to about 0.25% alkali-metal hydroxide, from about 0.02% to about 0.2% zinc oxide, and from about 0.01% to about 0.05% copper oxide.

17. A method for reducing sulfur-oxide emissions from an asphalt blowing process comprising:

adding to an asphalt an emission-reducing additive comprising at least one member selected from the group consisting of metal hydroxides, metal oxides, metal carbonates, and metal bicarbonates, and mixtures thereof, wherein the metal is selected from the group consisting of sodium, potassium, calcium, magnesium, zinc, copper, aluminum, and mixtures thereof, to form an asphalt-additive mixture;

subjecting the asphalt-additive mixture to a blowing process that produces a gas stream including sulfur-containing compounds;

passing the gas stream through a fiber filter to remove at least a portion of the sulfur-containing compounds, wherein the filter comprises fibers packed at a density of from about 130 kilograms/meter$^3$ to about 320 kilograms/meter$^3$, the ratio of the flow rate of the gas stream through the filter to the surface area of the filter is from about 0.9 (meters$^3$/minute)/meters$^2$ to about 9 (meters$^3$/minute)/meters$^2$, and the gas stream is at a temperature not greater than about 121° C. when passed through the filter;

and subjecting the filtered gas stream to an incineration process;

wherein the combination of the filter and the emission-reducing additive reduces sulfur-oxide emissions from the asphalt blowing process by at least about 50% by weight over the same process without the filter and emission-reducing additive.

18. A method as defined in claim 17, wherein the sulfur-oxide emissions are reduced by at least about 75% by weight over the same process without the filter and the emission-reducing additive.

19. A method for reducing sulfur-oxide emissions from an asphalt blowing process comprising:

adding to an asphalt an emission reducing-additive, in an amount of from about 0.1% to about 2.0% by weight of the asphalt combined with the emission-reducing additive, the emission-reducing additive comprising at least one metal hydroxide selected from the group consisting of sodium hydroxide, potassium hydroxide, calcium hydroxide, and magnesium hydroxide, and at least one metal oxide selected from the group consisting of zinc oxide, copper oxide, and aluminum oxide;

subjecting the asphalt to an air-blowing process that produces a gas stream including sulfur-containing compounds;

passing the gas stream through a filter to condense and remove at least a portion of the sulfur-containing compounds;

and subjecting the filtered gas stream to an incineration process.

* * * * *